(12) United States Patent
Ramos Valencia et al.

(10) Patent No.: US 10,081,293 B2
(45) Date of Patent: Sep. 25, 2018

(54) HEADLIGHT BEAM ADJUSTMENT SYSTEM AND RELATED METHOD

(71) Applicant: FORD GLOBAL TECHNOLOGIES, LLC, Dearborn, MI (US)

(72) Inventors: Ricardo Ramos Valencia, Mexico City (MX); Francisco Javier Quintero Pérez, Michoacán (MX)

(73) Assignee: Ford Global Technologies, LLC, Dearborn, MI (US)

(*) Notice: Subject to any disclaimer, the term of this patent is extended or adjusted under 35 U.S.C. 154(b) by 134 days.

(21) Appl. No.: 14/933,787

(22) Filed: Nov. 5, 2015

(65) Prior Publication Data

US 2017/0129388 A1 May 11, 2017

(51) Int. Cl.
| | |
|---|---|
| *B60Q 1/06* | (2006.01) |
| *F21V 19/02* | (2006.01) |
| *F21V 21/14* | (2006.01) |
| *B60Q 1/076* | (2006.01) |
| *B60Q 1/00* | (2006.01) |

(52) U.S. Cl.
CPC ........... *B60Q 1/076* (2013.01); *B60Q 1/0076* (2013.01)

(58) Field of Classification Search
CPC ..... B60Q 1/076; B60Q 1/0076; B60Q 1/0483
USPC .................. 362/526, 233, 465, 269; 211/78
See application file for complete search history.

(56) References Cited

U.S. PATENT DOCUMENTS

| | | | |
|---|---|---|---|
| 4,141,063 A | 2/1979 | Kumagai et al. | |
| 4,225,902 A | 9/1980 | Ishikawa et al. | |
| 4,276,581 A | 6/1981 | Orii et al. | |
| 4,482,939 A * | 11/1984 | Tishman | B60Q 1/076 362/269 |
| 4,722,030 A * | 1/1988 | Bowden | B60Q 1/2611 362/233 |
| 5,957,563 A | 9/1999 | Moore | |
| 6,012,829 A | 1/2000 | Natchoo | |

(Continued)

OTHER PUBLICATIONS

Headlight beam leveler (if equipped) Instruments and controls Subaru Impreza Owners Manual Subaru Impreza SubaruManuals.org 2 Pages, Jul. 7, 2015.

(Continued)

*Primary Examiner* — Anh Mai
*Assistant Examiner* — Glenn Zimmerman
(74) *Attorney, Agent, or Firm* — Jason Rogers; King & Schickli, PLLC

(57) ABSTRACT

A headlight beam adjustment system for a vehicle includes a first bracket attached to the vehicle and supporting a headlamp assembly, a second bracket attached to the headlamp assembly and supported by the first bracket, and a switch positioned in the passenger compartment for actuating a servomotor causing the second bracket and the headlamp assembly to rotate about an axis and the light beam to move in a first or a second direction depending on the direction of rotation of the second bracket. The headlight beam adjustment system may further include a ball joint connected at a first end to the servomotor and a second end to the second bracket. The ball joint may include a bearing stud connected to the servomotor at a first end, and a socket, positioned within a housing, for receiving a second end of the bearing stud. A related method of adjusting the headlight beams is disclosed.

15 Claims, 7 Drawing Sheets

(56) References Cited

U.S. PATENT DOCUMENTS

| | | | |
|---|---|---|---|
| 6,478,457 B1 * | 11/2002 | Manley | B60Q 1/10 |
| | | | 362/275 |
| 6,767,118 B2 | 7/2004 | Seif et al. | |
| 8,577,556 B1 * | 11/2013 | Noel, II | B60Q 1/085 |
| | | | 211/78 |
| 8,884,522 B2 | 11/2014 | Imaeda | |
| 2004/0037086 A1 * | 2/2004 | Pascutiu | B60Q 1/068 |
| | | | 362/526 |
| 2010/0080009 A1 * | 4/2010 | Yamazaki | B60Q 1/12 |
| | | | 362/465 |
| 2014/0091709 A1 | 4/2014 | Choi | |

OTHER PUBLICATIONS

2003 Honda GL1800/A Goldwing Owner's Manual Downloaded from www.Manualslib.com manuals search engine.

\* cited by examiner

HEADLIGHT BEAM ADJUSTMENT SYSTEM AND RELATED METHOD

TECHNICAL FIELD

This document relates generally to headlight beams generated by vehicle, and more specifically to a system of adjusting the headlight beams.

BACKGROUND

Throughout the years vehicle headlights, or the bulbs therein, can occasionally loosen or shift, or simply become misdirected as the vehicle's suspension changes over time. In these scenarios, the headlight beam often becomes directed in an undesirable manner. For example, the beam could be too high or too far to the left potentially distracting oncoming vehicles, or even too low preventing the vehicle operator from having a good view of its own path. Mechanical adjustment of the headlight beam has been an option for many years and is sufficient in most instances.

While sufficient to overcome the rare need for adjustment, there are times when intermittent issues create similar situations wherein the headlight beam becomes misdirected. For example, a vehicle loaded with vacation gear may cause the headlight beam to be too high. While the issue is intermittent, it would be desirable to have a simple way to adjust the headlight beam during the trip and to readjust the beam upon arrival and unpacking.

Even more, it would be desirable not to have to perform the task of locating the mechanical adjusters within the engine compartment and manually adjusting the headlight beams. Accordingly, a need exists for a means of adjusting the headlight beams of a vehicle without opening the hood. Preferably, the vehicle operator could adjust the headlight beams from within the passenger compartment without the need for tools or complex instructions. In this manner, both intermittent and non-intermittent issues can be readily and conveniently dealt with.

U.S. Pat. No. 4,225,902 describes a vehicle having a dashboard mounted controller for adjusting a headlamp assembly in order to control a headlamp beam. While sufficient to adjust the headlamps from within the passenger compartment, the described controller is limited to movement of the headlight beams in one direction, described as up or down. The controller is further limited to movement of the headlight assembly to one of three predetermined positions.

While these and similar systems are effective in certain limited circumstances, there are other circumstances when a vehicle operator requires or desires even more flexibility. Accordingly, a need exists for a method of fully adjusting the headlight beams of a vehicle from within the passenger compartment. Preferably, the vehicle operator would be able to adjust the right headlight, the left headlight or both at the same time. Even more, the adjustment would be continuous. In other words, the adjustment would be up/down and/or right/left allowing the beam to be adjusted in any direction. The only boundaries on the adjustment would be determined by applicable vehicle standards to prevent an operator from adjusting the headlight beam too high or too far to the left for example.

SUMMARY

In accordance with the purposes and benefits described herein, a headlight beam adjustment system for a vehicle is provided. The headlight beam adjustment system may be broadly described as comprising a first bracket attached to the vehicle and supporting a headlamp assembly, a second bracket attached to the headlamp assembly and supported by the first bracket, and a switch positioned in the passenger compartment for actuating a servomotor causing the second bracket and the headlamp assembly to rotate about an axis and the light beam to move in a first or a second direction depending on the direction of rotation of the second bracket.

In another possible embodiment, the headlight beam adjustment system further includes a ball joint connected at a first end to the servomotor and a second end to the second bracket. In yet another possible embodiment, the ball joint includes a bearing stud connected to the servomotor at a first end, and a socket, positioned within a housing, for receiving a second end of the bearing stud.

In still another possible embodiment, the axis is a horizontal axis and the light beam moves in an up or a down direction. In another, the light beam is continuously adjustable between an upper limit and a lower limit.

In one other possible embodiment, the axis is a vertical axis and the light beam moves in a right or left direction. In another, the light beam is continuously adjustable between right and left limits.

In other possible embodiments, the headlight beam adjustment systems described above are incorporated into a vehicle.

In accordance with an additional aspect, a system for adjusting a light beam generated by a vehicle comprises a headlamp assembly attached to a moveable bracket, a fixed bracket attached to the vehicle and supporting the moveable bracket, and a switch positioned in a passenger compartment of the vehicle for actuating first and second servomotors, wherein actuation of the first servomotor causes the moveable bracket to rotate about a horizontal axis and the light beam to move up or down depending on the direction of rotation of the moveable bracket, and actuation of the second servomotor causes the moveable bracket to rotate about a vertical axis and the light beam to move right or left depending on the direction of rotation of the moveable bracket.

In another possible embodiment, the light beam is continuously adjustable within a substantially quadrilateral area. In still another, boundaries of the substantially quadrilateral area are established by a range of motion of the first and second servomotors. In yet another, the outer limits of the boundaries of the substantially quadrilateral area are defined by Federal Motor Vehicle Safety Standard 108.

In one other possible embodiment, the system for adjusting a light beam generated by a vehicle further includes a first ball joint connected between the first servomotor and the moveable bracket, and a second ball joint connected between the second servomotor and the moveable bracket.

In another possible embodiment, the switch includes a selector switch for selecting to move a right headlamp assembly or a left headlamp assembly, and a direction switch for moving the selected headlamp assembly in a desired direction.

In yet another possible embodiment, the direction switch provides for movement in right, left, up, and down directions which together provide continuous adjustability within predetermined outer boundaries.

In accordance with another aspect, a method of adjusting headlight beams of a vehicle is provided. The method may be broadly described as comprising the steps of supporting a first moveable bracket attached to a first headlight assembly with a first fixed bracket attached to the vehicle, and actuating a first ball joint causing rotation of the first moveable bracket about a first axis for adjusting the headlight beams of the first headlight assembly in first or second directions.

In another possible embodiment, the method further includes the steps of actuating a second ball joint causing rotation of the first moveable bracket about a second axis for adjusting the headlight beams of the first headlight assembly in third or fourth directions.

In still another possible embodiment, the actuating step includes selecting a right headlight assembly or a left headlight assembly from within a passenger compartment of the vehicle. In yet another, the actuating step further includes selecting a direction of movement of the selected right headlight assembly or left headlight assembly from within a passenger compartment of the vehicle.

In one other possible embodiment, the actuating step further includes selecting a direction of movement of the right headlight assembly and the left headlight assemblies from within a passenger compartment of the vehicle.

In the following description, there are shown and described several preferred embodiments of the headlight beam adjustment system and the related methods of adjusting the headlight beams of a vehicle. As it should be realized, the systems, vehicles and methods are capable of other, different embodiments and their several details are capable of modification in various, obvious aspects all without departing from the assemblies and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the headlight beam adjustment system and related method of adjusting headlight beams, and together with the description serve to explain certain principles thereof. In the drawing figures.

Reference will now be made in detail to the present embodiments of the headlight beam adjustment system for a vehicle and related methods of adjusting the headlight beams, examples of which are illustrated in the accompanying drawing figures, wherein like numerals are used to represent like elements.

DETAILED DESCRIPTION

Figure 1:
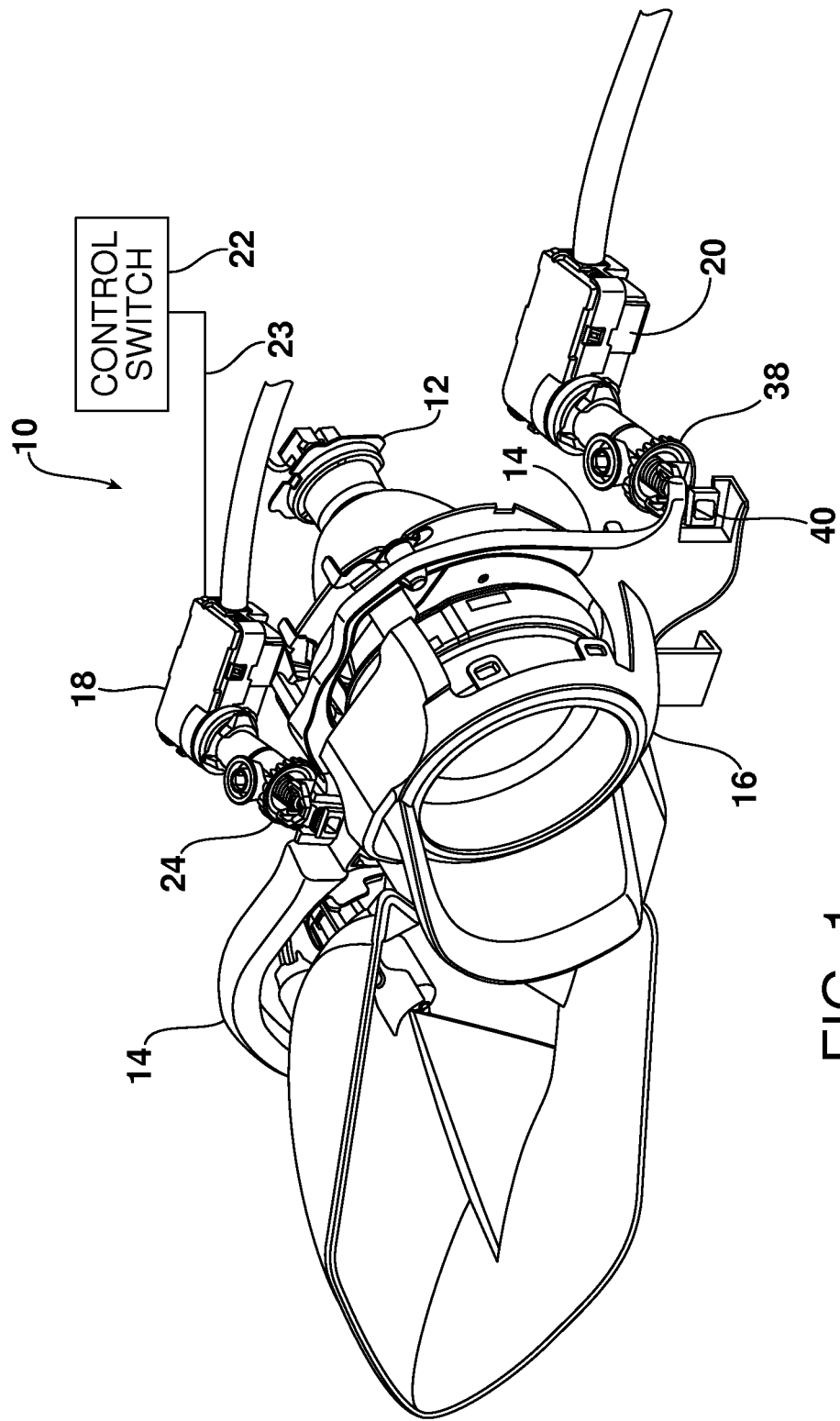
FIG. 1 is a perspective view of a headlight beam adjustment system.

Reference is now made to FIG. 1, which broadly illustrates an embodiment of a headlight beam adjustment system 10. The system includes a headlight assembly 12 attached to a bracket 14 for movement with the bracket. The bracket 14 itself is supported by a second bracket 16 which is attached to the vehicle. In the described embodiment, the second bracket 16 is attached to a frame of the vehicle (not shown) although in other embodiments, the second bracket may be attached to the facia or other structural surface of the vehicle.

A pair of actuators 18, 20 are electrically connected to a control switch 22 positioned in a passenger compartment of the vehicle via a cable 23. In the described embodiment, the actuators 18, 20 are linear actuators in the form of servomotors. In response to a signal from the control switch 22, an output shaft of the servomotors is extended or retracted to a desired position. Depending on the desired movement of the headlight assembly 12, one or both of the servomotors 18, 20 may be actuated. For example, if it is desired to direct the headlight beam lower than a current position, then the headlight assembly 12 is only required to be moved in one direction and only one servomotor is required. If it is desired to direct the headlight beam lower and to the right from a current position, then the headlight assembly 12 is required to be moved in two directions and both servomotors 18, 20 are required.

Figure 2:
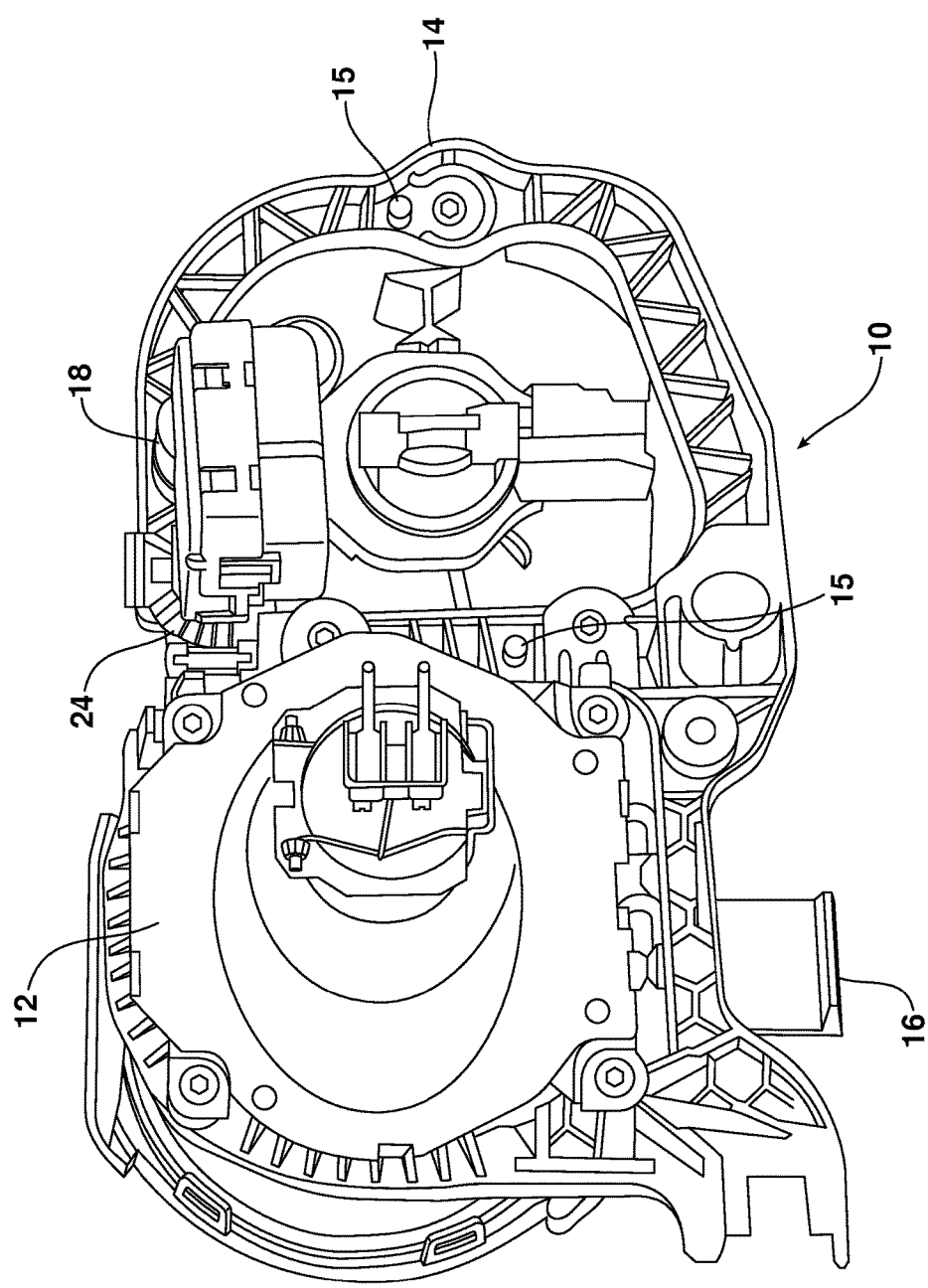
FIG. 2 is a rear perspective view of the headlight beam adjustment system.

FIG. 2 is a rear view of a portion of the headlight beam adjustment system 10. As shown, headlight assembly 12 is attached to bracket 14. Necessarily, movement of the bracket 14 in any direction will move the headlight assembly 12 and necessarily the headlight beam (B) generated thereby. As shown, bracket 14 is supported by pins 15 extending from the second bracket 16. This arrangement allows for movement of bracket 14 relative the second bracket 16 which is fixed to the vehicle.

Figure 3:
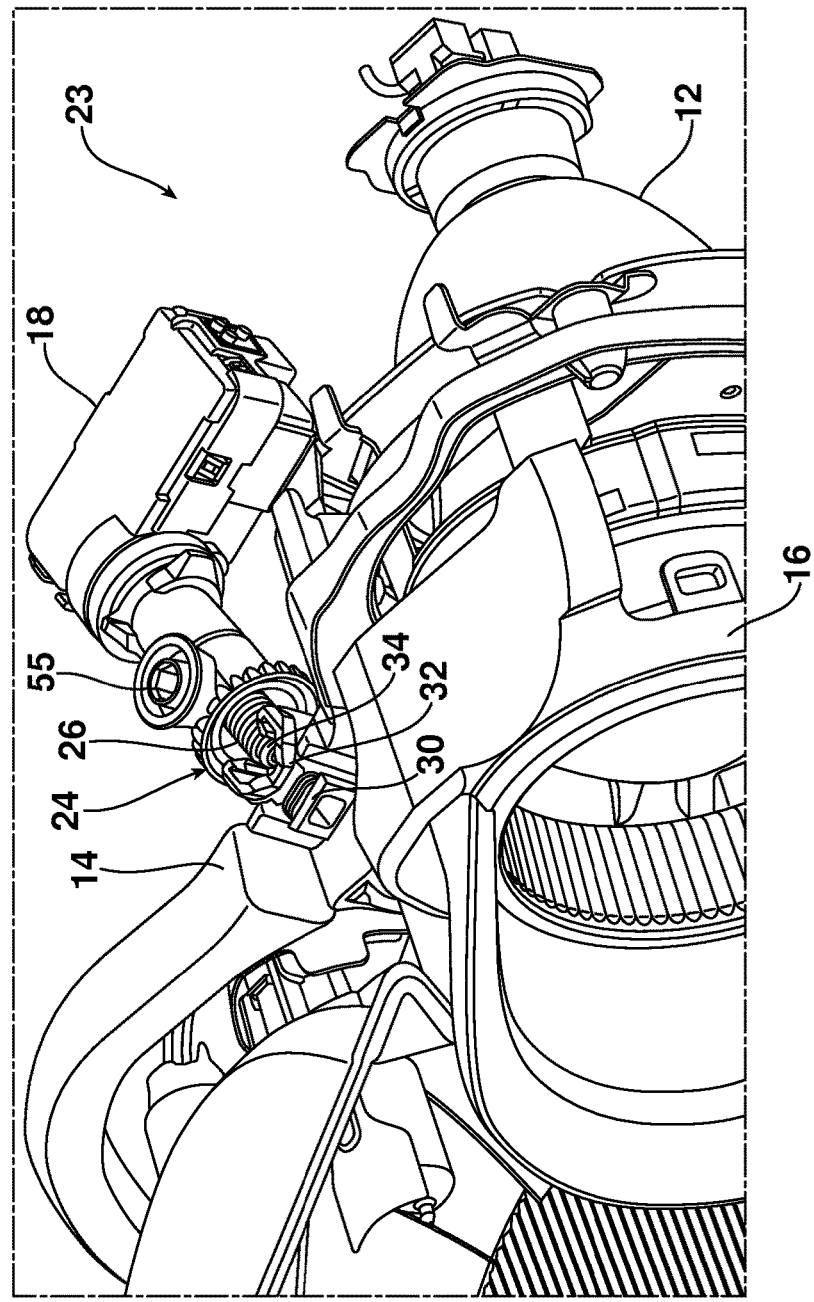
FIG. 3 is a partial perspective view of the headlight beam adjustment system showing a ball joint.

As shown in FIG. 3, servomotor 18 is attached to a ball joint 24. Generally speaking, a ball joint consists of a bearing stud, and a socket enclosed in a housing or a casing. In the described embodiment, the ball joint 24 includes a bearing stud 26 attached at a first end to a shaft of the servomotor 18. A housing 30 including a socket 32 is attached to the bracket 14. A second end of the bearing stud 26 includes a ball 34 which is received within the socket 30. The ball 34 and socket 32 allow for the rotational movement of the bracket 14 described below.

Figure 4:
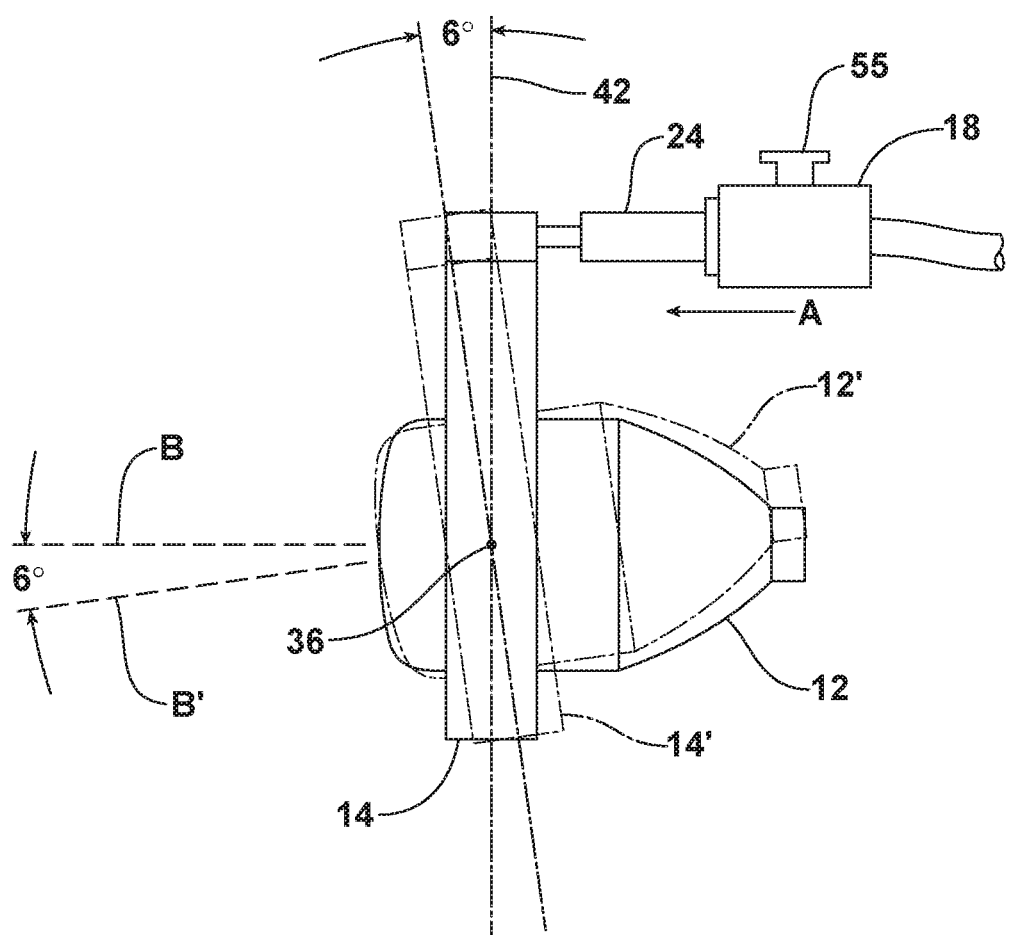
FIG. 4 is a side plan view of a headlight beam adjustment system showing rotation of a headlight assembly in a first (downward) direction.

In operation, actuation of the servomotor 18 in response to control switch 22 extends or retracts the shaft of the servomotor and necessarily the ball joint 24 which pushes or pulls the attached bracket 14. More specifically, as shown in FIG. 4, the bracket 14 is rotated about a substantially horizontal axis (depicted by pivot point 36) such that the light beam (B) moves in a first or second direction depending on the direction of rotation of the bracket 14. For example, if the shaft of the servomotor is extended as shown by action arrow A, thus extending or pushing the ball joint 24 toward the bracket 14, then the bracket and headlight assembly 12 will rotate about the horizontal axis and direct its light beam B downward. A distance the shaft of the servomotor is extended or retracted determines an amount of rotation of the bracket 14/headlight assembly 12.

As further shown in FIG. 4, the bracket 14 and the headlight assembly 12 are rotated about the horizontal axis, extending out of the drawing sheet through pivot point 36, a total of six degrees. The rotated headlight assembly 12 and bracket 14 are depicted in dashed line and designated 12' and 16'. This rotation moves the light beam from an initial position B to a second position B' which is a corresponding six degrees from the initial position B. Although not shown in this figure for clarity, the second bracket 16 supports the bracket 14 and the headlight assembly 12 for movement but is itself fixed in position in the described embodiment.

Similarly and as best shown in FIG. 1, the servomotor 20 is attached to a ball joint 38. Again, the ball joint 38 includes a bearing stud attached at a first end to a shaft of the servomotor 20. A housing 40 including a socket is attached to the second bracket 14. A second end of the bearing stud includes a ball which is received within the socket. It should be noted that both ball joints 24 and 28 include a receptacle 55 for mechanically extending or retracting the bearing stud. In the described embodiment, the receptacle 55 is configured to receive a screw driver.

Figure 5:
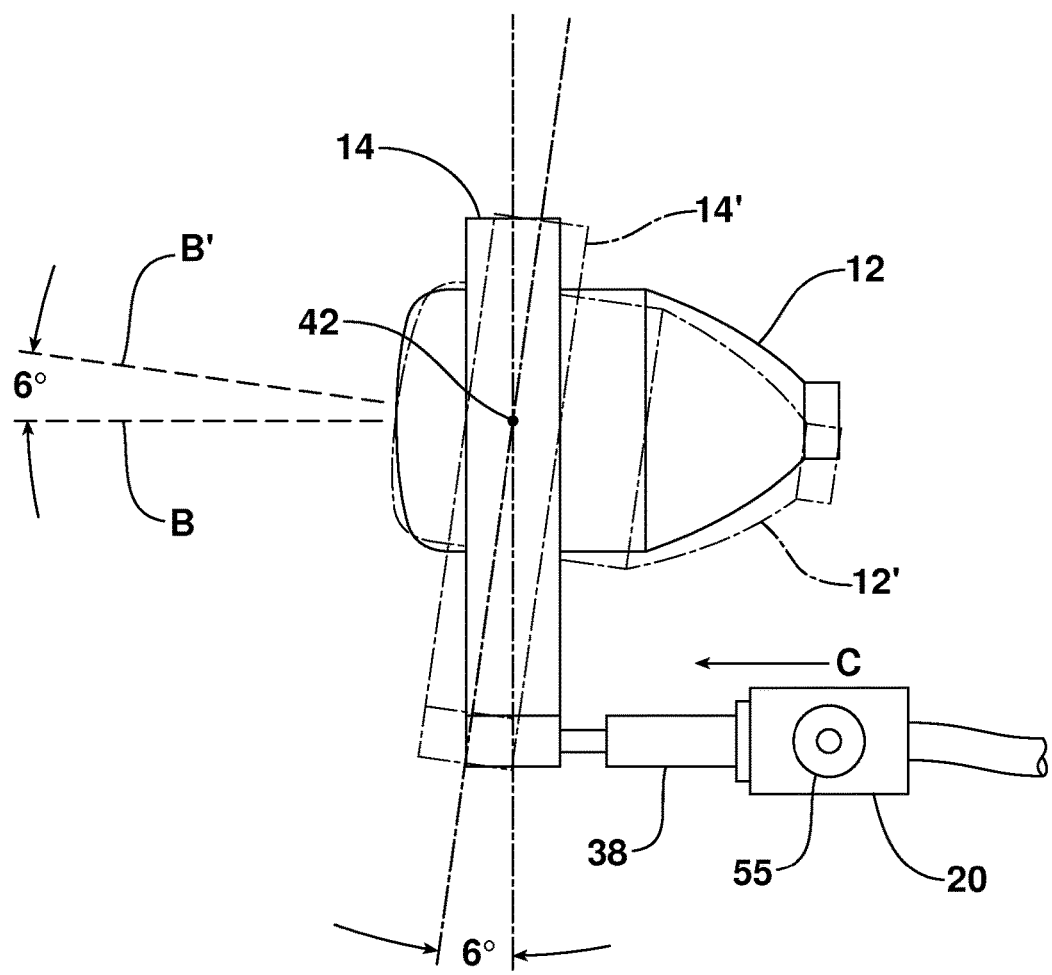
FIG. 5 is a top plan view of a headlight beam adjustment system showing rotation of a headlight assembly in a third (rightward) direction.

In operation, actuation of the servomotor 20 in response to control switch 22 extends or retracts the shaft of the servomotor and necessarily the ball joint 38 which pushes or pulls the attached bracket 14. More specifically, as shown in FIG. 5, the bracket 14 is rotated about a substantially vertical axis (depicted by pivot point 42) such that the light beam (B) moves in a first or second direction depending on the direction of rotation of the bracket 14. For example, if the shaft of the servomotor is extended as shown by action arrow C, thus extending or pushing the ball joint 38 toward the bracket 14, then the bracket and headlight assembly 12 will rotate about the vertical axis and direct light beam B toward the right. A distance the shaft of the servomotor is extended or retracted determines an amount of rotation of the bracket 14/headlight assembly 12.

Together, the distance the shafts of the servomotors are extended or retracted are limited in order to prevent the headlight beam B from being directed outside of certain boundaries. In the described embodiment, a direction of the light beam B is continuously adjustable within a substantially quadrilateral area given the two axis of rotation of the bracket 14. In alternate embodiments, the boundaries of the substantially quadrilateral area may be established by a range of motion of the first and second servomotors 18, 20, a range of motion of the bracket 14, or may be limited to ensure compliance with relevant regulations, for example, Federal Motor Vehicle Safety Standard 108.

As further shown in FIG. 5, the bracket 14 and the headlight assembly 12 are rotated about the vertical axis, extending out of the drawing sheet through pivot point 42, a total of six degrees. The rotated headlight assembly 12 and bracket 14 are depicted in dashed line and designated 12' and 16'. This rotation moves the light beam from an initial position B to a second position B' which is a corresponding six degrees from the initial position B. Again, the second bracket 16 is not shown in this figure for clarity but supports the bracket 14 and the headlight assembly 12 for movement while itself being fixed in position in the described embodiment.

Figure 6:
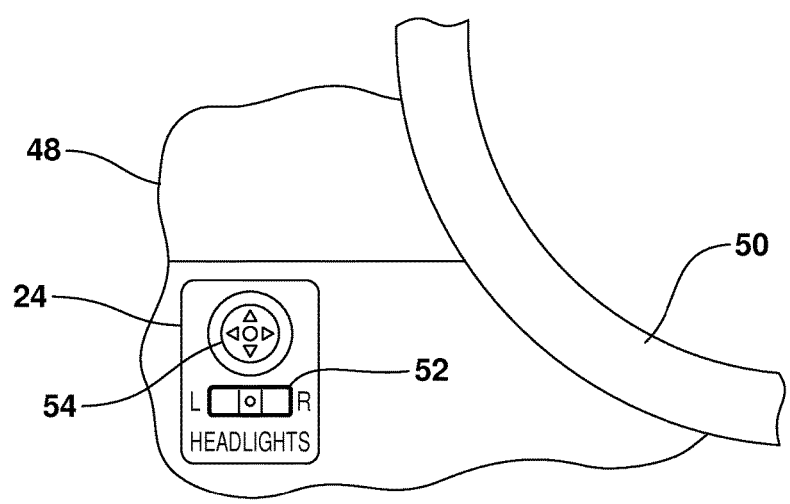
FIG. 6 is an illustration of an exemplary control switch positioned in a passenger compartment of a vehicle for controlling the headlight beam adjustment system.
Figure 7:
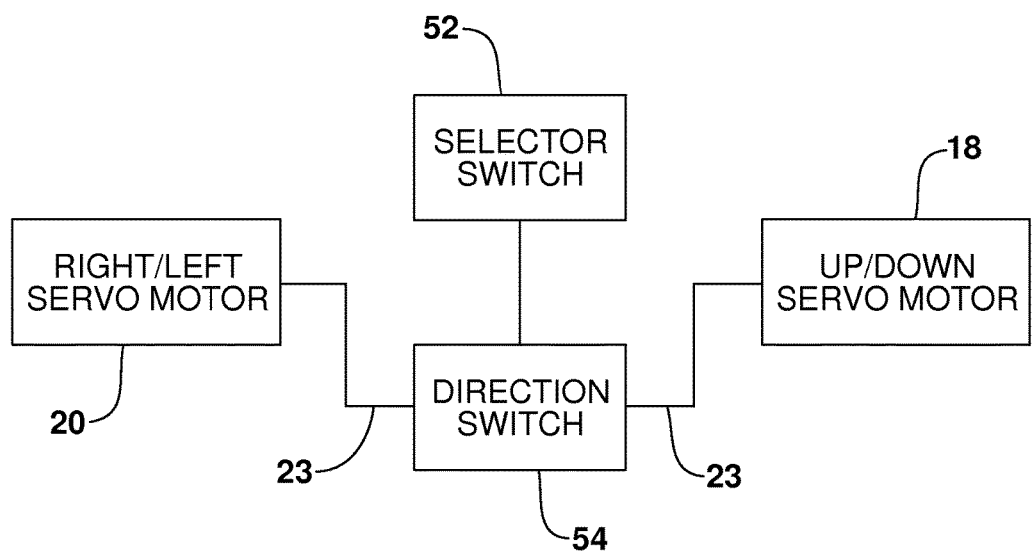
FIG. 7 is a schematic of the headlight beam adjustment system.

As shown in FIG. 6, the control switch 24 can be mounted on a dashboard 48 of the vehicle, for example, to the lower left of a steering wheel 50. In this position, the control switch 24 is relatively out of the way of the vehicle operator since adjustment of the headlight beams is typically utilized sparingly, but is conveniently located nonetheless. In alternate embodiments, the control switch 24 can be mounted essentially anywhere within the passenger compartment given its limited utilization, or even elsewhere in the vehicle. For instance, the control switch 24 could be positioned on an armrest of a driver's side door, in a glovebox of the vehicle, under the hood, or elsewhere on the dashboard 48. As shown, the described control switch 24 includes a first selector switch 52, which is a toggle switch, for selecting between right and left headlight assemblies 12, and a second direction switch 54 for moving the selected headlight beam left/right and/or up/down. Control signals from switch 54 are provided via cable 23 to the selected servomotor 18 or 20 as shown in FIG. 7.

In another aspect of the invention, a method of adjusting headlight beams of a vehicle includes the steps of supporting a first moveable bracket 14 attached to a first headlight assembly 12 with a first fixed bracket 16 attached to the vehicle, and actuating a ball joint 24 causing rotation of the first moveable bracket 14 about a first axis for adjusting the headlight beams in a first or second direction. As described above, the bracket 14 is moved through actuation of the ball joint 24 by servomotor 18. The bracket 14 is rotated about a first horizontal axis causing the headlight beam B to move upward or downward depending on whether the ball joint 24 is being moved forward through extension or rearward through retraction of the shaft of servomotor 18. Even more, the method may include the step of actuating a second ball joint 38 causing rotation of the first bracket 14 about a second axis for adjusting the headlight beams B in a third or fourth direction. Again, the bracket 14 is moved through actuation of the ball joint 38 by servomotor 20. The bracket 14 is rotated about a vertical axis causing the headlight beam B to move toward the right or left depending on whether the ball joint 38 is being moved forward or rearward by the servomotor 20.

The actuating step may include selecting a right headlight assembly 12 or a left headlight assembly from within a passenger compartment of the vehicle utilizing a selector switch 52. Once selected, the actuating step may further include selecting a direction of movement of the selected headlight assembly from within the passenger compartment utilizing direction switch 54. In an alternate embodiment, as noted above, the actuating step may include moving both the right and the left headlight assemblies 12 at the same time. In such an embodiment, the selector switch 52 may include a third option, i.e., both headlight assemblies, or may be deleted in which case both headlight assemblies would always be moved together. In these scenarios, the direction switch 54 is used to select a direction of movement of the headlight assemblies 12.

In summary, numerous benefits result from providing a headlight beam adjustment system for a vehicle. The described system allows the vehicle operator to fully adjust the headlight beams from within the passenger compartment, Even more, the vehicle operator is able to adjust the right headlight, the left headlight or both at the same time and the adjustment is continuous. This means that the adjustment is up/down and/or right/left allowing the headlight beam to be adjusted in any direction.

The foregoing has been presented for purposes of illustration and description. It is not intended to be exhaustive or to limit the embodiments to the precise form disclosed. Obvious modifications and variations are possible in light of the above teachings. For example, although the embodiment described includes rotation about horizontal and vertical axes, the axes of rotation be in different orientations. If not horizontal and vertical, a simple up/down adjustment would then simply require actuation of both actuators to effect the desired movement. All such modifications and variations are within the scope of the appended claims when interpreted in accordance with the breadth to which they are fairly, legally and equitably entitled.

What is claimed:

1. A headlight beam adjustment system for a vehicle, comprising:
   a first bracket attached to the vehicle and supporting a headlamp assembly;

a second bracket attached to and at least partially surrounding said headlamp assembly and supported by said first bracket for rotation about a first axis and a second axis; and a switch positioned in the passenger compartment for actuating a servomotor causing said second bracket and said headlamp assembly to rotate about at least one of the first axis and the second axis relative the first bracket.

2. The headlight beam adjustment system for a vehicle of claim 1, wherein said first bracket includes first and second pins extending therefrom for supporting said second bracket.

3. The headlight beam adjustment system for a vehicle of claim 1, further comprising a ball joint connected at a first end to said servomotor and a second end to said second bracket.

4. A vehicle incorporating headlight beam adjustment system of claim 1.

5. The headlight beam adjustment system for a vehicle of claim 3, wherein said ball joint includes a bearing stud connected to said servomotor at a first end, and a socket, positioned within a housing, for receiving a second end of said bearing stud.

6. The headlight beam adjustment system for a vehicle of claim 5, wherein the first axis is a horizontal axis.

7. The headlight beam adjustment system for a vehicle of claim 5, wherein the second axis is a vertical axis.

8. A system for adjusting a light beam generated by a vehicle, comprising:

a fixed bracket attached to the vehicle and supporting a moveable bracket;

a headlamp assembly attached to and at least partially surrounding said moveable bracket supported by said fixed bracket for rotation about a horizontal axis and a vertical axis; and a switch positioned in a passenger compartment of the vehicle for actuating first and second servomotors, wherein actuation of said first servomotor causes said moveable bracket to rotate about the horizontal axis and the light beam to move up or down depending on the direction of rotation of said moveable bracket, and actuation of said second servomotor causes said moveable bracket to rotate about the vertical axis and the light beam to move right or left depending on the direction of rotation of said moveable bracket relative the fixed bracket.

9. The headlight beam adjustment system for a vehicle of claim 8, wherein said fixed bracket includes first and second pins extending therefrom for supporting said moveable bracket.

10. The system for adjusting a light beam generated by a vehicle of claim 9, wherein the light beam is continuously adjustable within a substantially quadrilateral area.

11. A vehicle incorporating headlight beam adjustment system of claim 9.

12. The system for adjusting a light beam generated by a vehicle of claim 10, wherein boundaries of said substantially quadrilateral area are established by a range of motion of said first and second servomotors.

13. The system for adjusting a light beam generated by a vehicle of claim 10, further comprising a first ball joint connected between said first servomotor and said moveable bracket, and a second ball joint connected between said second servomotor and said moveable bracket.

14. The system for adjusting a light beam generated by a vehicle of claim 13, wherein the switch includes a selector switch for selecting to move a right headlamp assembly or a left headlamp assembly, and a direction switch for moving the selected headlamp assembly in a desired direction.

15. The headlight beam adjustment system for a vehicle of claim 14, wherein the direction switch provides for movement in right, left, up, and down directions which together provide continuous adjustability within predetermined outer boundaries.

* * * * *